United States Patent
Nguyen

(10) Patent No.: US 9,935,909 B2
(45) Date of Patent: Apr. 3, 2018

(54) DEVICE, SYSTEM AND METHOD FOR SMART NOTIFICATIONS

(71) Applicant: BlackBerry Limited, Waterloo (CA)

(72) Inventor: Nam Nguyen, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 352 days.

(21) Appl. No.: 13/673,408

(22) Filed: Nov. 9, 2012

(65) Prior Publication Data
US 2014/0136629 A1    May 15, 2014

(51) Int. Cl.
G06F 15/16    (2006.01)
H04L 12/58    (2006.01)

(52) U.S. Cl.
CPC ............ H04L 51/24 (2013.01); H04L 51/36 (2013.01)

(58) Field of Classification Search
CPC ............................... H04L 51/24; H04L 51/36
USPC ................................................ 709/206, 207
See application file for complete search history.

(56) References Cited

U.S. PATENT DOCUMENTS

| | | | |
|---|---|---|---|
| 6,965,918 B1* | 11/2005 | Arnold et al. | 709/206 |
| 7,779,151 B2* | 8/2010 | Major et al. | 709/236 |
| 7,890,596 B2* | 2/2011 | Guy | 709/207 |
| 8,024,415 B2 | 9/2011 | Horvitz et al. | |
| 8,346,881 B1* | 1/2013 | Cohen | 709/206 |
| 2003/0195937 A1 | 11/2003 | Kircher, Jr. et al. | |
| 2008/0153554 A1* | 6/2008 | Yoon | H04M 1/72547 455/567 |
| 2009/0210497 A1 | 8/2009 | Callanan et al. | |
| 2010/0088378 A1* | 4/2010 | Asawa | H04L 12/587 709/206 |

FOREIGN PATENT DOCUMENTS

| | | |
|---|---|---|
| EP | 1603066 | 12/2005 |
| EP | 2141569 | 1/2010 |
| WO | 2012/027749 | 3/2012 |

OTHER PUBLICATIONS

European Patent Office, "Extended European Search Report", issued in connection with EP application No. 12192071.4, dated Apr. 16, 2013 (7 pages).
Communication Pursuant to Article 94(3) EPE issued in EP Application No. 12192071.4 dated May 17, 2017; 5 pages.

* cited by examiner

Primary Examiner — Chirag R Patel
Assistant Examiner — Rachel J Hackenberg
(74) Attorney, Agent, or Firm — Fish & Richardson P.C.

(57) ABSTRACT

A device, system and method for smart notifications is provided. When a new message is received for a unified mailbox, a relevance level associated with the new message is determined at a processor of the device, the unified mailbox providing messages received via a communication interface of the device from a plurality of accounts, a notification device of the device is controlled, via the processor, to provide a notification based on the relevance level, the notification being one of a plurality of multi-level notifications, each associated with different relevance levels.

13 Claims, 9 Drawing Sheets

DEVICE, SYSTEM AND METHOD FOR SMART NOTIFICATIONS

FIELD

The specification relates generally to devices, and specifically to a device, system, and method for smart notifications.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices. In particular, audible alerts comprising ringing, beeping or the like are used to alert people to events, but can be distracting, for example in meetings or the like.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
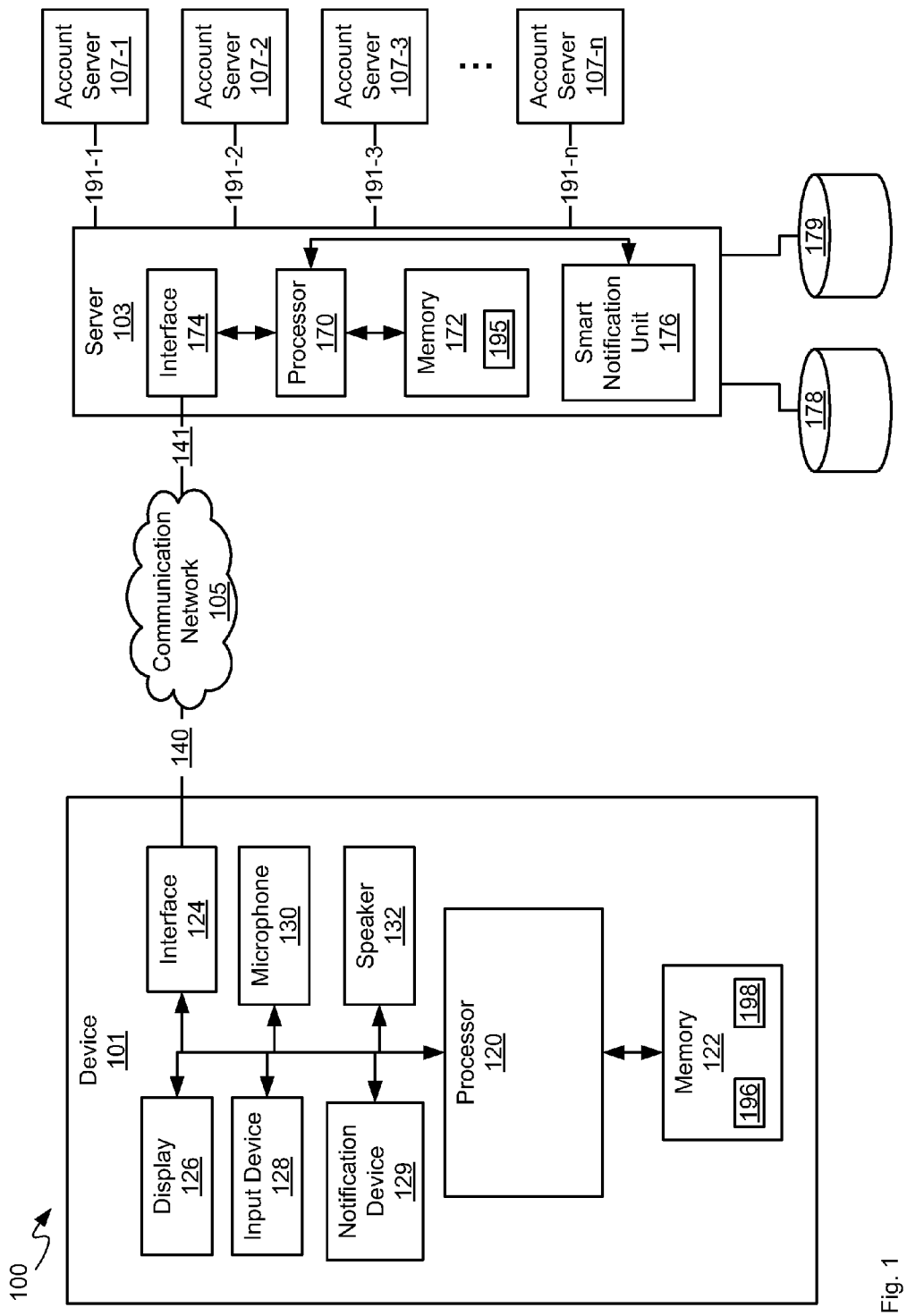
FIG. 1 depicts a system for smart notifications, according to non-limiting implementations.

An aspect of the specification provides a device comprising: a processor, a communication interface, and a notification device, the processor enabled to: when a new message is received for a unified mailbox, determine a relevance level associated with the new message, the unified mailbox providing messages received via the communication interface from a plurality of accounts; and control the notification device to provide a notification based on the relevance level, the notification being one of a plurality of multi-level notifications, each associated with different relevance levels.

The processor can be further enabled to determine the relevance level by receiving the relevance level from a server via the communication interface. The processor can be further enabled to distinguish the relevance level from an importance level associated with the new message, the importance level originating at a sender device that sent the new message.

The relevance level can be based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern.

The device can further comprise a memory storing associations between the plurality of multi-level notifications and the different relevance levels.

The notification device can comprise one or more of a vibration device and a haptic device. The plurality of multi-level notifications can comprise one or more of a multi-level of vibration of the vibration device, different levels of vibration of the vibration device, and different vibration patterns. The plurality of multi-level notifications can be controlled by one or more of duration of vibration of the vibration device and power of the vibration device.

The device can further comprise an input device and wherein one or more of the plurality of multi-level notifications can be manually set by receiving input data at the input device.

The processor can be further enabled to provide the notification one or more of in tandem and in combination with a further notification.

Another aspect of the specification provides a method comprising: when a new message is received for a unified mailbox, determining, at a processor of a device, a relevance level associated with the new message, the unified mailbox providing messages received via a communication interface of the device from a plurality of accounts; and controlling, at the processor, a notification device of the device to provide a notification based on the relevance level, the notification being one of a plurality of multi-level notifications, each associated with different relevance levels.

The method can further comprise determining the relevance level by receiving the relevance level from a server via the communication. The method can further comprise distinguishing the relevance level from an importance level associated with the new message, the importance level originating at a sender device that sent the new message.

The relevance level can be based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern.

The method further comprising storing associations between the plurality of multi-level notifications and the different relevance levels at a memory of the device.

The notification device can comprise one or more of a vibration device and a haptic device and the plurality of multi-level notifications can comprise one or more of a multi-level of vibration of the vibration device, different levels of vibration of the vibration device, and different vibration patterns. The plurality of multi-level notifications can be controlled by one or more of duration of vibration of the vibration device and power of the vibration device.

One or more of the plurality of multi-level notifications can be manually set by receiving input data at an input device of the device.

The method can further comprise providing the notification one or more of in tandem and in combination with a further notification.

A further aspect of the specification provides a computer program product, comprising a computer usable medium having a computer readable program code adapted to be executed to implement a method comprising: when a new message is received for a unified mailbox, determining, at a processor of a device, a relevance level associated with the new message, the unified mailbox providing messages received via a communication interface of the device from a plurality of accounts; and controlling, at the processor, a notification device of the device to provide a notification based on the relevance level, the notification being one of a plurality of multi-level notifications, each associated with different relevance levels. The computer usable medium can comprise a non-transitory computer usable medium.

FIG. 1 depicts a system 100 for smart notifications, according to non-limiting implementations. System 100 generally comprises a device 101 in communication with a server 103 via at least one communications network 105. Server 103 is in turn in communication with account servers 107-1, 107-2, 107-3 . . . 107-$n$, according to non-limiting implementations. Account servers 107-1, 107-2, 107-3 . . . 107-$n$ will be interchangeably referred to hereafter, collectively, as account server 107, and generically as an account server. The at least one communications network 105 will be interchangeably referred to hereafter as network 105. Device 101 comprises a processor 120 interconnected with a memory 122, a communications interface 124 (interchangeably referred to hereafter as interface 124), a display 126, an input device 128, a notification device 129, and optionally a microphone 130 and speaker 132. It is further appreciated that device 101 communicates with server 103 via interface 124, a link 140 between device 101 and network 105, and a link 141 between server 103 and network 105. Server 103 comprises a processor 170 interconnected with a memory 172, a communications interface 174 (interchangeably referred to hereafter as interface 174) and, optionally, a smart notification unit 176, server 103 further in communication with optional message store 178 and a smart directory 179, each of which can be local or remote from server 103. It is appreciated that one or more of message store 178 and smart directory 179 can be stored at memory 122 and/or another memory at server 103 and/or at memory device external to server 103. It is further appreciated that server 103 communicates with a account servers 107 via interface 174, and respective link 191-1, 191-2, 191-3 . . . 191-$n$ between server 103 account servers 107.

In any event, as will presently be described, processor 120 is generally enabled to: when a new message is received for a unified mailbox, determine a relevance level associated with the new message, the unified mailbox providing messages received via the communication interface 124 from a plurality of accounts; and, control notification device 129 to provide a notification based on the relevance level, the notification being one of a plurality of multi-level notifications, each associated with different relevance levels.

Device 101 can be any type of electronic device that can be used in a self-contained manner. Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Server 103 is generally enabled to manage messages for device 101, and indeed it is appreciated that, in particular non-limiting implementations, server 103 receives messages from account servers 107 via a respective link 191, the messages intended for device 101, and forward the messages onto device 101 via links 140, 141 and network 105. Similarly, server 103 can receive messages from device 101 via links 140, 141 and network 105, the messages intended for respective account servers 107, and forward the messages to respective account servers 107 via respective links 191.

Server 103 is further generally enabled to determine a relevance level of each message to be forwarded to device 101, and configure each message with an associated relevance level, as will presently be described. Such relevance levels can be determined at smart notification unit 176. Smart notification unit 176 can comprise any suitable combination of hardware components and software components and can further comprise a software module that can be processed by processor 170. However, smart notification unit 176 can comprise a processor separate from processor 170, dedicated to determining relevance levels of messages. While smart notification unit 176 has been described as optional, when smart notification unit 176 is not distinctly present at server 103, processor 170 performs the functionality of smart notification unit 176.

In some implementations, memory 172 can store an application 195 that, when processed by processor 170 and/or smart notification unit 176, enables processor 170 and/or smart notification unit 176 to determine a relevance level of each message to be forwarded to device 101, and configure each message with an associated relevance level, as will presently be described. Hence, application 195 can enable smart notification unit 176 and/or processor 170 to determine relevance levels. It is yet further appreciated that application 195 is an example of programming instructions stored at memory 172.

It is yet further appreciated that message store 178 stores a history of messages between device 101 and account servers 107, and smart directory 179 stores information associated with relationships between senders and recipients of messages, as will be described in more detail below. Further, each of message store 178 and smart directory 179 can comprise a database of respective data. While each of message store 178 and smart directory 179 has been described as optional, when one or more of message store 178 and smart directory 179 is not present in system 100, memory 172 stores the data that would otherwise be stored at message store 178 and smart directory 179.

Server 103 can otherwise be based on any well-known server environment including a module that houses one or more central processing units (i.e. processor 170 comprises one or more central processing units), volatile memory (e.g. random access memory), persistent memory (e.g. hard disk devices) (i.e. memory 172 comprises volatile memory and persistent memory) and network interfaces (i.e. interface 174 comprises one or more network interfaces) to allow server 103 to communicate over links 141, 191. In general, it will be appreciated that interface 174 is configured to correspond with the network architecture that is used to implement links 141, 191 as described below.

For example, server 103 can comprise a Sun Fire 8800 series server running a UNIX operating system, from Oracle Corporation, Inc. of Santa Clara Calif., and having eight central processing units each operating at about three thousand megahertz and having more than sixteen gigabytes of random access memory. However, it is to be emphasized that this particular server is merely exemplary, and a vast array of other types of computing environments for server 103 are contemplated. It is further more appreciated that server 103 can comprise any suitable number of servers that can perform different functionality of server implementations described herein.

It is yet further appreciated that server 103 further comprises a mail server handling messages for device 101, and a plurality of devices similar to device 101. Indeed, while only one device 101 is depicted in system 100, it is appreciated that system 100 can comprise a plurality of devices similar to device 101, and server 103 can handle message, and determine respective relevancy levels, on behalf of each of the plurality of devices, including device 101.

Link 140 comprises any suitable link for enabling device 101 to communicate with network 105. Similarly, link 141 comprises any suitable link for enabling server 103 to communicate with network 105. Similarly, links 191 comprises any suitable links for enabling server 103 to communicate with account servers 107. Links 140, 141, 191 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, BLUETOOTH™ links, NFC (near field communication) links, WiFi links, WIMAX™ links, packet based links, the Internet, analog networks, the PSTN (public switched telephone network), access points, and the like, and/or a combination. It is yet further appreciated that, links 191 can include network 105: in other words, data and/or messages which are transmitted via links 191 can be transmitted via network 105.

Each of account servers 107 is enabled to manage one or more respective accounts associated with device 101, and indeed each account server 107 can comprise any suitable combination of servers, each of which can be similar or different from server 103. For example, each of account servers 107 can comprise one or more of an email server, a message server, a social media server, and the like, and device 101 can be associated with one or more an email account, a messaging account, a social media account, and the like, at one or more of account servers 107. Messages can hence be generated, and/or received, and/or transmitted and/or forwarded to device 101 via each of account servers 107, the messages comprising one or more of email messages, text messages, social media messages and the like. While not depicted, it is further appreciated that each of account servers 107 can be in further communication with remote devices via network 105 and/or one or more other communication networks, and can one or more of transmit and/or forward messages between device 101 and the remote devices.

It is appreciated that FIG. 1 further depicts a schematic diagram of device 101 according to non-limiting implementations. It should be emphasized that the structure of device 101 in FIG. 1 is purely an example, and contemplates a device that can be used for both wireless voice (e.g. telephony) and wireless data communications (e.g. email, web browsing, text, and the like). However, while FIG. 1 contemplates a device that can be used for telephony, in other implementations, device 101 can comprise a device enabled for implementing any suitable specialized functions including, but not limited to, one or more of telephony, computing, appliance, and/or entertainment related functions.

Device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 128 is received at processor 120 (which can be implemented as a plurality of processors, including but not limited to one or more central processors (CPUs)). Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores application 196 that, when processed by processor 120, enables processor 120 to: when a new message is received for a unified mailbox, determine a relevance level associated with the new message, the unified mailbox providing messages received via the communication interface 124 from a plurality of accounts; and control notification device 129 to provide a notification based on the relevance level, the notification being one of a plurality of multi-level notifications, each associated with different relevance levels.

It is yet further appreciated that application 196 is an example of programming instructions stored at memory 122.

Processor 120 in turn can also be configured to communicate with display 126, and optionally a microphone 130 and a speaker 132. Display 126 comprises any suitable one of or combination of CRT (cathode ray tube) and/or flat panel displays (e.g. LCD (liquid crystal display), plasma, OLED (organic light emitting diode), capacitive or resistive touch screens, and the like). When display 126 comprises a touch screen, it is appreciated that display 126 and input device 128 can be combined into one apparatus. Microphone 130, when present, comprises any suitable microphone for receiving sound and converting the sound to sound data. Speaker 132, when present, comprises any suitable speaker for providing sound from sound data, audible alerts, audible communications received from remote communication devices, and the like, at device 101.

In some implementations, input device 128 and display 126 are external to device 101, with processor 120 in communication with each of input device 128 and display 126 via a suitable connection and/or link.

Processor 120 also connects to interface 124, which can be implemented as one or more radios and/or connectors and/or network adaptors, configured to communicate with network 105 via link 140. In general, it will be appreciated that interface 124 is configured to correspond with the network architecture that is used to implement link 140, as described above. In other implementations a plurality of links with different protocols can be employed and thus interface 124 can comprise a plurality of interfaces to support each link.

In any event, it is appreciated that any suitable combination of interfaces is within the scope of present implementations.

Notification device 129 can comprise one or more of a vibration device, a vibratory motor and a haptic device. Notification device 129 is generally enabled to be controlled to a plurality of notification levels to provide the plurality of multi-level notifications. In particular, notification device 129 can be controlled to a plurality of multi-levels of vibration which can include, but is not limited to, different vibration patterns, different levels of vibration, and the like. The notification device 129 can be controlled to different levels of vibration, and the like, by controlling one or more of a duration of vibration and a power of vibration. In other words, the plurality of multi-level notifications is controlled by one or more of duration of vibration of the vibration device and power of the vibration device. Hence, as messages are received with different relevance levels, processor 120 can control notification device 129 to one of the plurality of multi-levels of vibration.

For example, memory 122 can further store data 198 storing associations between the plurality of multi-level notifications and the different relevance levels. For example, in a specific non-limiting implementation, data 198 can comprise the contents of Table 1 as follows:

TABLE 1

| Relevance Level | Notification Level |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |

While Table 1 is arranged in rows and columns, it is appreciated that Table 1 can be arranged in any suitable format. Further, Table 1 comprises a column, "Relevance Level" of different relevance levels and a corresponding column "Notification Level" of corresponding notification levels for each relevance level. Further, while notification levels are provided in a generic scale of 1 to 10, in other implementations, notification levels can be provided as one or more of vibration levels, vibration patterns and power levels for controlling notification device 129. In other words, in some implementations, data 198 can comprise instructions for operating notification device 129 to different notification levels based on the relevance level. Furthermore, data 198 can comprise power levels to which notification device 129 can be controlled when a corresponding relevance level is determined.

It is further appreciated that in specific non-limiting implementations, the higher the relevance level of a message, the more relevant the message is considered to be (i.e. "1" is lowest and "10" is highest); correspondingly, the higher the notification level, the more intense the notification level (i.e. "1" is lowest and "10" is highest). For example, at a first relevance level, notification device 129 can be controlled to a first notification level; and at a second relevance level higher than the first relevance level, notification device 129 can be controlled to second notification level that is more intense and/or higher than the first notification level, with intensity controlled by increasing a vibration level and/or a power level of notification device 129. For example, a power level of vibration at the second notification level can be higher than a power level at the first notification level.

Further, while a scale of ten relevance levels and ten corresponding notification levels are provided in specific non-limiting implementations, in other implementations fewer or more than ten relevance levels and ten corresponding notification levels can be used. Further the scale of relevance levels configured at device 101 and server 103 are generally appreciated to be the same.

It is yet further appreciated that one or more of the vibration levels, vibration patterns and power levels for controlling notification device 129 can be pre-provisioned at device 101. However, in other implementations, one or more of the plurality of multi-level notifications can be manually set by receiving input data at input device 128. In other words, a user of device 101 can manually set one or more of the vibration levels, vibration patterns and power levels for controlling notification device 129 for one or more of the plurality of multi-level notifications by interacting with input device 128 to access menus, and the like, for changing the vibration levels, vibration patterns and power levels and the like. For example, while one or more of the vibration levels, vibration patterns and power levels for controlling notification device 129 for each of the plurality of multi-level notifications can be pre-provisioned at device 101, in some implementations, a user of device 101 can change one or more of the vibration levels, vibration patterns and power levels for controlling notification device 129 for one or more of the plurality of multi-level notifications to a desired vibration level, vibration pattern, power level and the like.

While relevance levels and notification levels have been described with respect to numeric values, in other implementations, other indicators of relevance and notification levels can be used. For example, rather than a numeric scale, a natural language scale could be used for relevance level using such terms as "extremely low" "very very low", "very low", "low", "medium", "important", "very important", "urgent", "very urgent", "extremely urgent", with each term indicating increasing levels of relevance, each of which can be associated with a numeric level of relevance. Similarly, a natural language scale could be used for notification level using such terms as "extremely low vibration" "very very low vibration", "very low vibration", "low vibration", "medium vibration", "important vibration", "very important vibration", "urgent vibration", "very urgent vibration", "extremely urgent vibration", which each term indicating increasing levels of vibration and/or power level at notification device 129. Each term can be further associated with an operational level of notification device 129 and/or operating conditions for notification device 129.

It is yet further appreciated that device 101 comprises a power source (not depicted), for example a battery or the like. In some implementations the power source can comprise a connection to a mains power supply and a power adaptor (e.g. and AC-to-DC (alternating current to direct current) adaptor).

Further, it should be understood that in general a wide variety of configurations for device 101 are contemplated.

Figure 2:
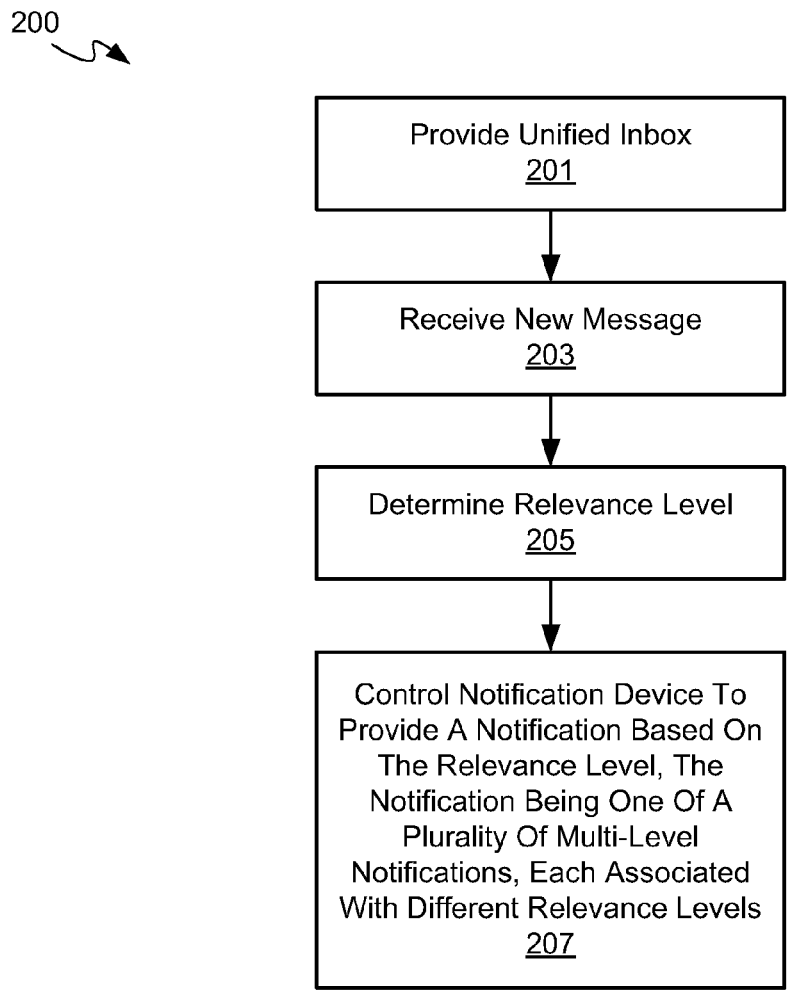
FIG. 2 depicts a flowchart of a method for smart notifications, according to non-limiting implementations.

Attention is now directed to FIG. 2 which depicts a flowchart of a method 200 for smart notifications, according to non-limiting implementations. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present implementations.

It is appreciated that, in some implementations, method 200 is implemented in system 100 by processor 120 of device 101. Indeed, method 200 is one way in which device 101 can be configured. It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood, however, that method 200 can be implemented on variations of system 100 as well.

At block 201, processor 120 provides a unified mailbox at display 126, the unified mailbox providing messages received via the communication interface from a plurality of accounts. It is appreciated, however, that block 201 is optional and the unified mailbox need not be initially provided for the remainder of method 200 to be implemented. For example, messages can be received whether the unified mailbox is provided at display 126 or not. In any event, at block 203, a new message is received at device 101 for the unified mailbox, for example via interface 124 from server 103. At block 205, when a new message is received for the unified mailbox, processor 120 determines a relevance level associated with the new message. At block 207, processor controls notification device 129 to provide a notification based on the relevance level, the notification being one of a plurality of multi-level notifications, each associated with different relevance levels.

Figure 3:
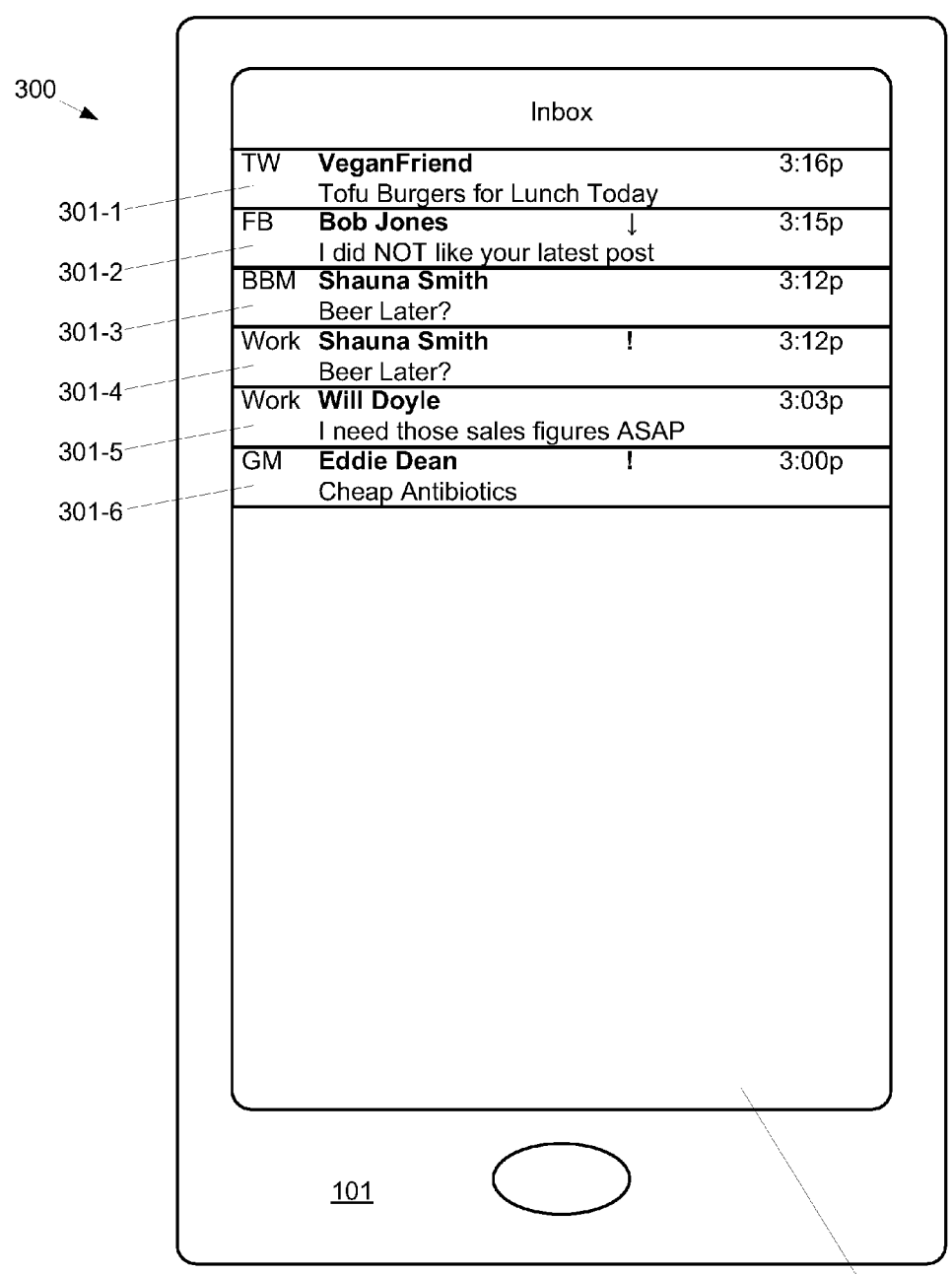
FIG. 3 depicts a perspective view of a device of the system of FIG. 1, the device providing a Graphic User Interface (GUI) of a unified mailbox at a display, according to non-limiting implementations.
Figure 4:
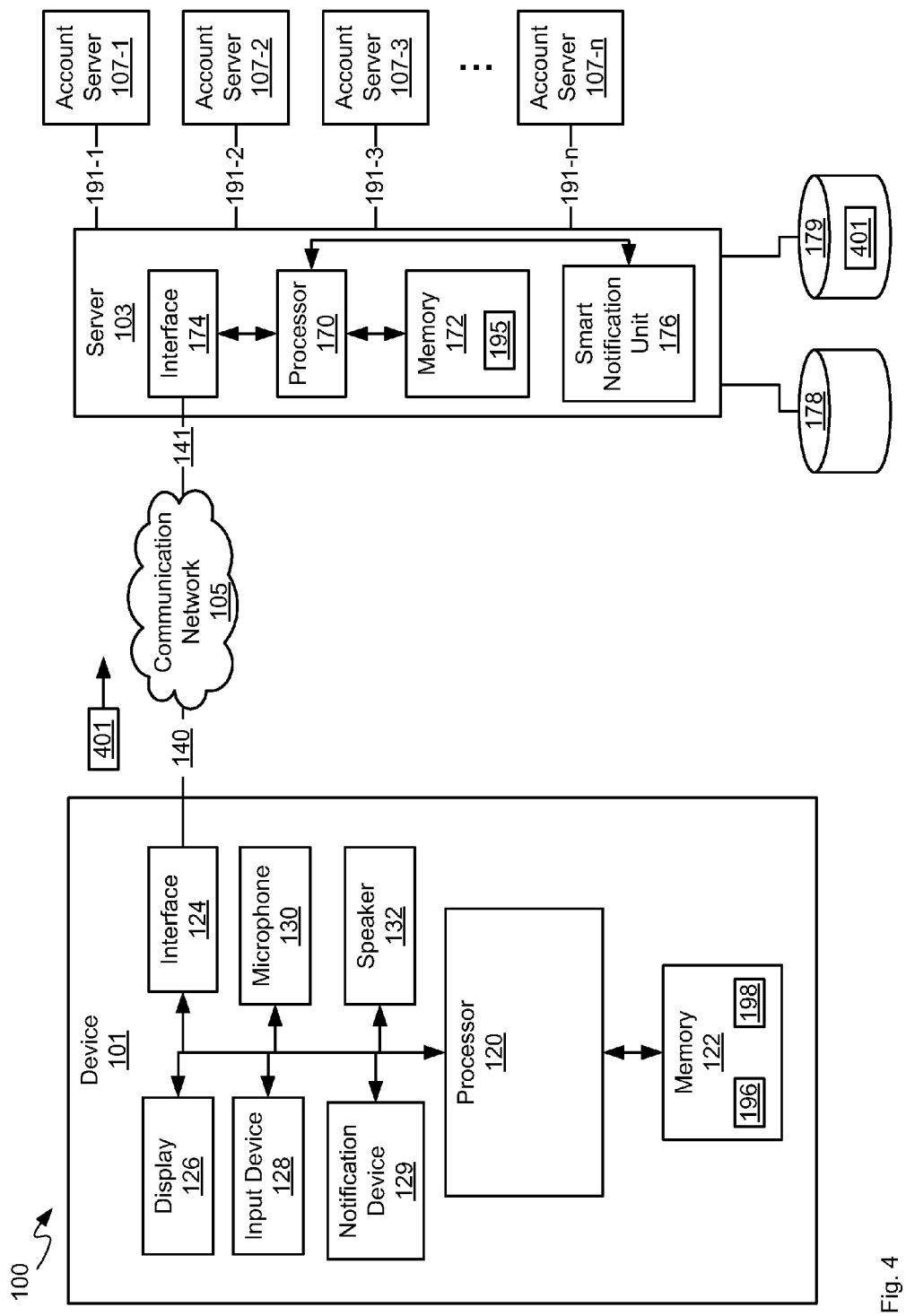
FIG. 4 depicts the system of FIG. 1 with reading pattern data being transmitted from the device to a server, according to non-limiting implementations.
Figure 5:
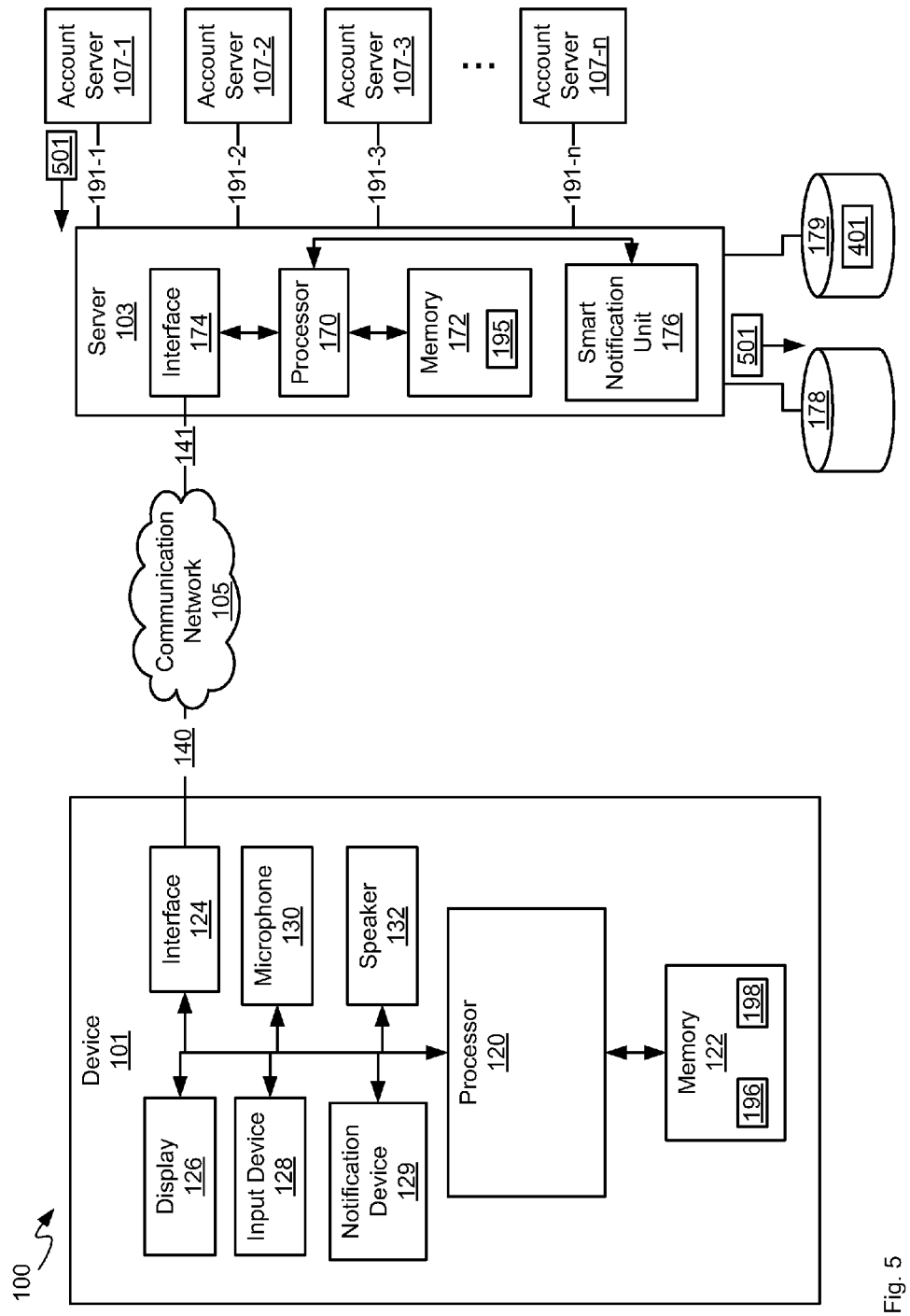
FIG. 5 depicts the system of FIG. 1 with a message for the device being received at the mail server from an account server, according to non-limiting implementations.
Figure 6:
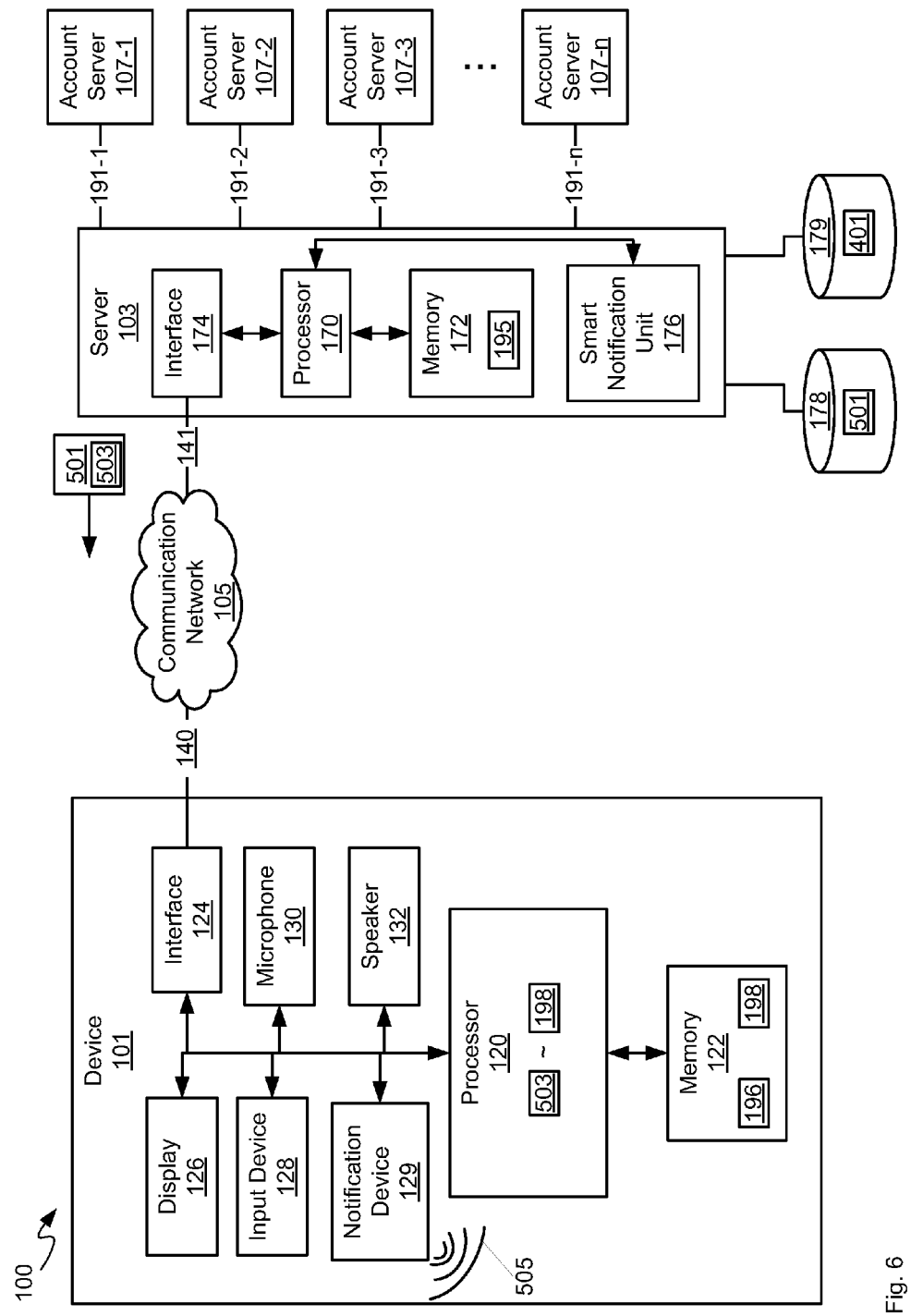
FIG. 6 depicts the system of FIG. 1 a modified message being transmitted to the device from the server, the modified message comprising relevance level data, according to non-limiting implementations.

Non-limiting examples of method 200 will now be described with reference to FIGS. 3 to 6. FIG. 3 depicts non-limiting implementation of a graphic user interface (GUI) of a unified mailbox at display 126. FIGS. 4 to 6 are each similar to FIG. 1, with like elements having like numbers.

Hence, attention is next directed to FIG. 3 which depicts a non-limiting example of a GUI of a unified mailbox 300 provided at display 126 of device 101. Unified mailbox 300 (referred to hereafter as mailbox 300), comprises a plurality of fields 301-1, 301-2, 303-3, 301-4, 301-5, 301-6 (collectively fields 301, and generically a field 301) each corresponding to a message at mailbox 300. While six messages are depicted at mailbox 300, one in each field 301, the number of messages at mailbox 300 is generally appreciated to be non-limiting.

In any event, each field 301 comprises an indication of an account associated with respective messages: for example, the textual indicators "TW", "FB", "BBM", "Work", "GM", each indicate a different account at a respective account server 107, each account associated with device 101. In other words, device 101 is enabled to receive messages associated with each of the accounts indicated by the textual indicators. Further, while textual indicators are depicted, in other implementations, graphical indicators and/or a combination of textual and graphical indicators could be provided. In yet further implementations, the indication of the account is optional.

In addition, each field 301 can comprise an indication of a sender of the respective message (e.g. "VeganFriend", "Bob Jones", "Shauna Smith", "Will Doyle", "Eddie Dean"), a time that a respective message is received, and a subject of the respective message (e.g. on the second line of each field 301). At least the sender and the subject can be received with a respective message in a respective header and/or metadata of the message.

In some implementations, one or more fields 301 can further comprise an indication of an importance level of a respective message. For example, field 301-2 comprises a symbol "↓", which is indicative of a low importance message, while fields 301-4, 301-6 each comprise a symbol "!", which is indicative of a high importance message. It is further appreciated that the importance level originates at a sender device associated with each message, and is generally chosen by the user of the sender device when composing the message, regardless of the content of the message. For example, while each of fields 301-4, 301-6 are indicated to be high importance by virtue of the symbol "!", the content of at least a subject of each message (i.e. "Beer Later?" and "Cheap Antibiotics") would indicate otherwise: in other words, the importance level can be set by a user of a sender device only to gain the attention of a user of device 101, regardless of the actual importance of the respective message. The respective importance level can be received with a respective message in a respective header and/or metadata of the message.

It is further appreciated that the content of each field 301 is generally non-limiting and can include any suitable indication of a respective message.

In any event, it is appreciated that mailbox 300 is provided by processor 120 at display 126, at block 201, but that mailbox 300 need not be provided at display 126 for the remainder of method 200 to be implemented.

It is further appreciated that messages for device 101 are received via server 103 from account servers 107, and further a relevance level of each message can be based on one or more of a sender of a message, a subject of a message, keywords in a message, an account associated with a message, a sender-recipient social connection, for example as indicated in smart directory 179, an interaction history, a topic-interest history, a manual relevance level history of previous messages manually set by a reader of the previous messages, and a reading pattern.

For example, with reference to FIG. 5, smart directory 179 can be populated, and/or pre-populated, with sender-recipient social connections, which can be retrieved from one or more account servers 107 and/or from another server (not depicted) storing an organizational data of an entity associated with device 101. For example, social media servers can store social relationships between users, such as parent-child relationships, sibling relationships, whether users are acquaintances, close friends and the like. Further organizational data can comprise relationships between employees at an entity, such as a business or the like; hence, relationships in an organizational tree can be stored at smart directory 179 including, but not limited to, titles of employees of the entity and/or organizational relationships between users (e.g. such who reports to whom). While each of these relationships is described herein with respect to natural language, it is appreciated that each of the relationships can be assigned a numeric value, which can be processed to determine an associated numeric relevance level.

Smart directory 179 can be initially populated in a provisioning process, with device 101 (and/or another device associated with device 101) providing permissions for server 103 to access data at account servers 107 and/or at the another server storing the organizational data. Population of data at smart directory 179 can be on-going: as relationship data changes at account servers 107, data at smart directory 179 can be updated accordingly, either upon request by server 103 and/or periodically and/or in push operations from respective account servers 107 and/or the another servers.

In any event, smart notification unit 176 can comprise machine learning algorithms to learn which data in messages associated with device 101 is relevant and determine relevance levels of messages. For example, with reference to FIG. 4, device 101 can be enabled to determine reading patterns of messages at device 101 and transmit reading pattern data 401 to server 103 for processing by processor 170 and/or to be received as input to smart notification unit 176 and/or for storage at smart directory 179 (as depicted). It is further appreciated that reading pattern data 401 is transmitted independent of messages send to or from device 101. In other words, reading pattern data 401 associated with a given message can be transmitted at any time after the given message is received and/or opened at device 101, independent of when the given message is received and/or opened. For example, when the given message is not opened after a given time, reading pattern data 401 indicating such can be transmitted after the given time period (for example, 24 hours after receiving the given message) indicating that the given message is not opened. If the given message is subsequently opened, new reading pattern data indicating such can be transmitted to server 103. Hence, reading pattern data 401 can comprise identifiers of messages, along with associated reading pattern data, which can be cross referenced with messages stored at message store 178, such that full content of messages are not sent with reading pattern data 401.

In any event, to determine reading pattern data, device 101 can be enabled to determine a time difference between when a message is received at device 101 and when a message is read, as well as how long a message is in an open state at device 101 (e.g. how long a user of device 101 spends reading a message). Smart notification unit 176 can hence determine which messages are most relevant and which messages are least relevant. For example, the a time difference between when a message is received at device 101 and when a message is read can be compared to one or more threshold values indicative of one or more relevance levels. Similarly, the time period that a message has been read can be compared to one or more respective threshold values indicative of one or more relevance levels. Further, it can be determined that messages from a manager of a user associated with a device 101 have a high relevance level. Relevance levels of subjects and/or keywords in messages, as well as a sender high relevance level, can also be determined based on reading patterns of messages containing given subjects and/or keywords and/or from given senders. Further, a relevance level of accounts can be determined, based on one or more of reading patterns and/or data populated at smart directory 179, for example by an administrator of system 100.

Furthermore, in some implementations, device 101 can receive from a reader of messages (i.e. a user of device 101), for example via input device 128, a manual relevance level of one or more messages at device 101. For example, a manual relevance level of a message can be received from a reader of a message via pull down menus, prompts, and the like, using the scale provided in Table 1. Hence, reading pattern data 401 can further include a manual relevance level history of previous messages manually set by a reader of the previous messages to provide further feedback to smart notification unit 176 when determining relevance level of new messages.

It is further appreciated the exchange of reading pattern data between device 101 and server 103 is representative of a new protocol between devices and mail servers.

In any event, any suitable factors can be used to determine relevance level at server 103 including, but not limited to, work accounts being given a higher relevance level than social media accounts. A weighted determination of a final relevance level can be determined from all the relevance levels determined from reading patterns, social relationships, accounts, and the like.

Further, smart notification unit 176 can comprise any suitable combination of machine learning algorithms to determine relevance levels of messages. It is further appreciated that as more messages are received, and more reading pattern data is received, the accuracy of predicting relevance level of smart notification unit 176 will improve.

It is further appreciated that while smart notification unit 176 can process an importance level of messages, the importance level received at server 103 with each message (e.g. which is generally provided at one of two levels: high importance and low importance), an importance level of a message is different from a relevance level of a message as described herein, and smart notification unit 176 can distinguish there between. In other words, an importance level is set by a sender of a message, while a relevance level is determined by smart notification unit 176. Further, an importance level of a message as determined by smart notification unit 176 can be different from an importance level as received at server 103 with a message. Further, a message can comprise a high importance level, but can be determined to have a low relevance level, and vice versa.

For example, as described above, and with reference to FIG. 3, the message associated with field 301-6 with a subject of "Cheap Antibiotics" has been marked as important by a sender of the message, but comprises spam and/or an unwanted message, and hence can be determined to have an extremely low relevance level (e.g. the lowest relevance level of Table 1, or "1").

In any event, attention is next directed to FIG. 5, where a new message 501 is received at server 103 from account server 107-1, new message 501 intended for device 101. It is presumed in FIG. 5 that both message store 178 and smart directory 179 have been configured as described above and machine learning algorithms at smart notification unit 176 have been enabled to determine a relevance level of new message 501 based on content of new message 501, including, but not limited to sender data, header data, subject data, keywords, and the like, and data stored at message store 178 and/or smart directory 179. Relevance level can hence be based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern.

In any event, new message 501 is processed at server 103 to determine a relevance level of new message 501, as described above. Further, a copy of new message 501 is stored in message store 178 for later processing to compare with associated reading pattern data to be received from device 101, as described above.

With reference to FIG. 6, server 103 modifies new message 501 to include relevance level data 503 and modified new message 501 is transmitted to device 101 with relevance level data 503, relevance level data 503 comprising the relevance level determined by server 103, as described above. For example, in a new protocol, relevance level data 503 can be incorporated into one or more of a header of new message 501 and metadata of new message 501, for example in a field different from an importance level field.

New message 501 and relevance level data 503 is received at device 101 via interface 124 (e.g. block 203 of method 200) and relevance level data 503 is compared to data 198 to determine a notification level to which notification device 129 is to be controlled (e.g. block 205 of method 200). For example, a relevance level stored in relevance level data 503 can be compared to Table 1 (i.e. data 198), as described above, to determine which of the plurality of multi-level notifications notification device 129 is to be controlled. In other words, processor 120 determines a relevance level of new message 501 by receiving the relevance level from server 103 via interface 124. In doing so, processor 120 is further enabled to distinguish the relevance level from an importance level associated with new message 501, the importance level originating at a sender device that sent new message 501, as described above. In any event, processor 120 controls notification device 129 to provide a notification 505 based on the relevance level, the notification being one of a plurality of multi-level notifications, each associated with different relevance levels (e.g. block 207 of method 200), as described above.

Figure 7:
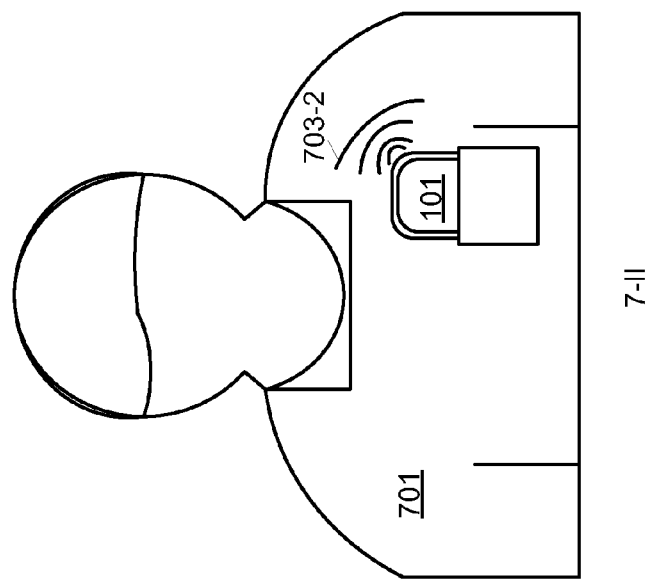
FIG. 7 depicts two scenarios at the device of FIG. 1, where the relevance level of the message is low in one scenario and relatively higher in the second scenario, according to non-limiting implementations.
Figure 7:
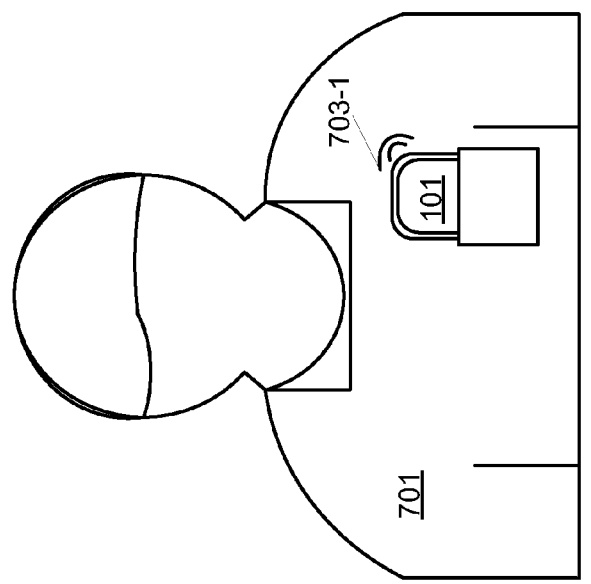

In any event, attention is next directed to FIG. 7 which depicts two views 7-I, 7-II each respectively depicting a different notification scenarios that occurs when a relevance level of new message 501 is determined. It is assumed in FIG. 7 that device 101 is on a person of a user 701, for example device 101 has been placed in a pocket of user 701. In view 7-I a relevance level of new message 501 can be determined to be low, for example in the range of 1 to 3 in the scale of Table 1, and a notification 703-1 is provided by notification device 129 that is at a commensurately low power, low vibration level, and the like. In contrast, in view 7-II, a relevance level of new message 501 can be determined to be high, for example in the range of 8 to 10 in the scale of Table 1, and a notification 703-2 is provided by notification device 129 that is at a commensurately high power, high vibration level, and the like. It is further appreciated that while the terms "low" and "high" are relative terms, in the context of present implementations, low relevance level, low notification level, low power, low vibration level, and the like are appreciated to be respectively low as compared to the terms high relevance level, high notification level high power, high vibration level, and the like. In other words, when the terms "low" and "high" are used herein, they used relative to one another. Hence, a "low" first notification level is less than a "high" second notification level. Further, the higher power, or the like, of notification 703-2, as compared to notification 703-1, is indicated by a greater number of lines of notification 703-2 as compared to notification 703-1 in FIG. 7.

In any event, from the level of notification 703-1, 703-2, user 701 can determine that: a. a message has been received; and b. the relevance level of the received message.

Figure 8:
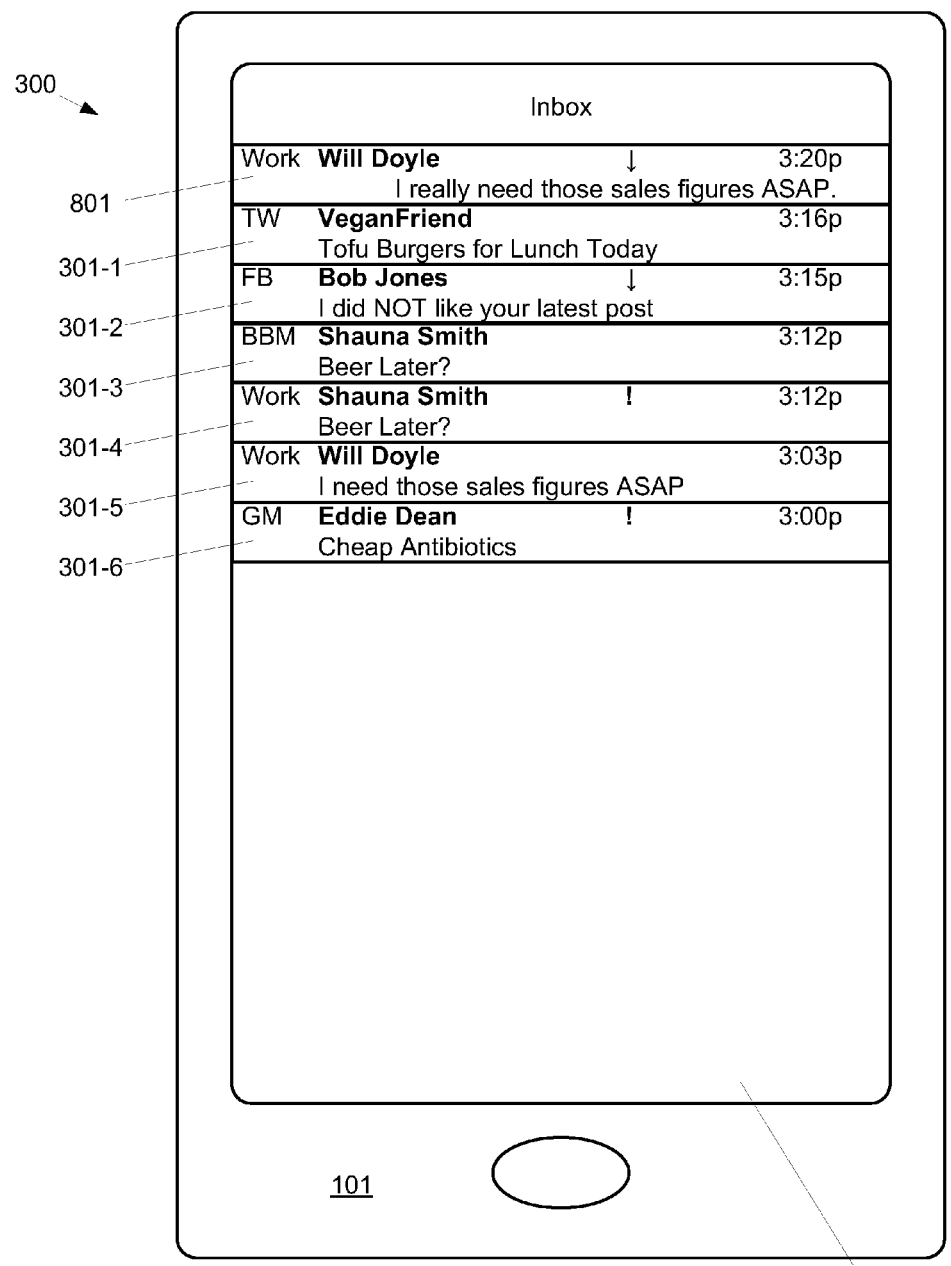
FIG. 8 depicts the GUI of FIG. 3 after a new message is received, according to non-limiting implementations.

Attention is next directed to FIG. 8, which is substantially similar to FIG. 3, with like elements having like numbers, and depicts unified mailbox 300 after new message 501 has been received. In particular, unified mailbox 300 comprises a new field 801 comprising data indicative of new message 501. It is appreciated that, in these non-limiting example limitations, field 801 indicates that new message 501 is from a "Work" account, and from a user named "Will Doyle". It is further appreciated that "Will Doyle" can be a manager of a user of device 101, as determined from smart directory 179. It is further appreciated that a subject of new message 501 contains keywords "sales figures" and "ASAP" (i.e. "as soon as possible"), which can each be stored in smart directory 179 as keywords which generally are associated with high relevance levels. It can be further determined from previous reading pattern data, that previous messages from "Will Doyle" were opened within a first threshold time period after being received at device 101, and read for a time period that is above a second threshold time period. In any event, smart notification unit 176 can process these factors and determine that new message 501 has a very high relevance level, for example, a relevance level of "10" in the scale of Table 1 (i.e. the highest relevance level). The relevance level is then received with new message 501.

Hence, even though new message 501 has been marked as low importance, as indicated by the symbol "↓" in field 801, processor 120 responds to the relevance level of "10" by controlling notification device 129 to provide the highest notification of the plurality of multi-level notifications.

It is yet further appreciated that notifications based on relevance level can be turned on and off at device 101, for example via any suitable combination of pull-down menus and the like. In some of these implementations, notifications based on relevance level can be provided only when device 101 is placed in one or more of a relevance level mode, a quiet mode and the like.

Figure 9:
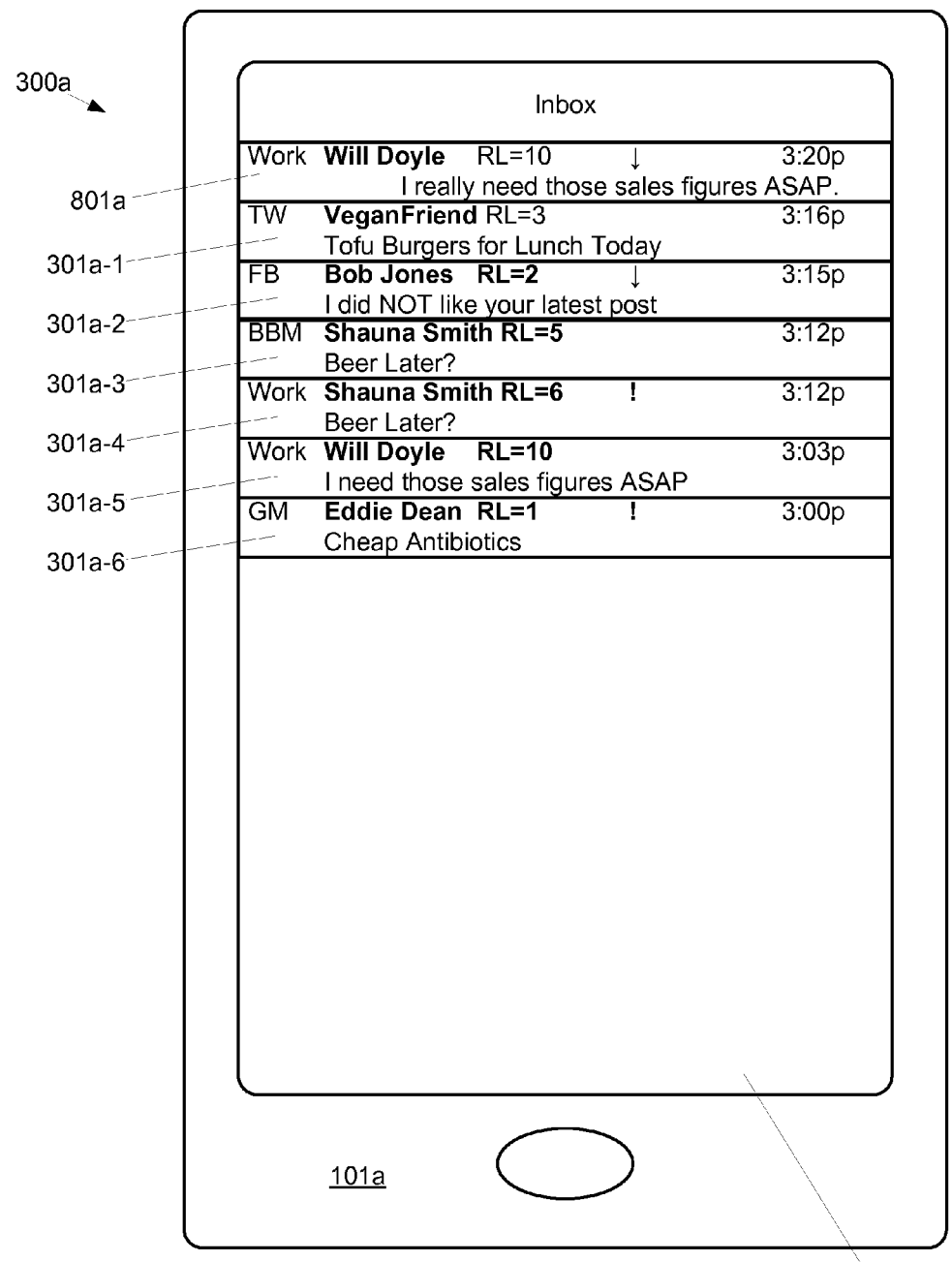
FIG. 9 depicts a perspective view of a Graphic User Interface (GUI) of an alternative unified mailbox, according to non-limiting implementations.

Persons skilled in the art will appreciate that there are yet more alternative implementations and modifications possible. For example, attention is next directed to FIG. 9, which depicts a perspective view of an alternative unified mailbox 300a provided at a display 126a of a device 101a, similar to FIG. 3. Device 101a is substantially similar to device 101, and is further appreciated to be in communication with a server similar to server 101. It is further appreciated that device 101a, and the associated server, each respectively function similar to device 101 and server 103. It is yet further appreciated that, while not depicted, device 101a further comprises a processor, a memory, a communications interface, an input device, a notification device, and optionally a microphone and speaker, each substantially similar to memory 122, interface 124, input device 128, notification device 129, microphone 130 and speaker 132, as described above. Further display 126a is substantially similar to display 126.

In any event, mailbox 300a is also substantially similar to mailbox 300, however each field 301a-1, 301a-2, 303-3, 301a-4, 301a-5, 301a-6 (collectively fields 301a, and generically a field 301a), 801a corresponding to a message at mailbox 300a, further comprises a respective indication of relevance level of each corresponding message. For example each field 301a, 801a comprises text "RL=" (i.e. "RL" standing for relevance level) followed by a textual indicator of relevance level as received from server 103 with each respective message, as selected from the scale of Table 1. While textual indicators of relevance level are described herein, it is further appreciated that any suitable indicator of relevance level for one or more messages can be provided at mailbox 300a including, but not limited to, any suitable combination of graphical and textual indicators.

Hence, an indicator of relevance level, different from an importance level, can be provided. For example, in field 801a, a relevance level of "10" is provided (i.e. the highest value of the scale of Table 1), while the importance level has been set to low, as indicated by the symbol "↓"; in other words, the sender of the message associated with field 801a can have accidentally set the importance level of the message to low, when the message was actually extremely urgent. The relevance level of a message can hence supersede the importance level of a message at least with regards to how notification devices are controlled when messages are received (presuming notifications based on importance level have been configured at device 101a and/or device 101). Similarly, the importance level of the message of field 301a-6 has been set to high, as indicated by the symbol "!", but the message is clearly spam and hence the relevance level has been set to the lowest value in the scale of Table 1.

Similarly, the importance level of the messages of field 301a-4 has been set to high, and the relevance level has been set to "6", indicating the message is of moderate relevance. The importance level of the messages of field 301a-2 has been set to low, and the relevance level has been set to "2", which is commensurate with the importance level.

In any event, it is appreciated that the relevance level as described herein is representative of a new field in one or more of message headers and message metadata, and is different from a field for importance levels.

It is further appreciated that notifications associated with relevance levels can supersede notifications associated with accounts, senders, importance levels and the like. For example, in some implementations, special notifications can be associated with specific accounts, senders and the like so that the specific notifications are provided when messages are received from respective accounts, respective senders and the like. However, when notifications associated with relevance are turned on at device 101 and/or device 10a, the notifications associated with relevance levels supersede any notifications based on other factors. Alternatively, notifications based on relevance level can be provided in tandem with notifications based on other factors, for example before or after the notifications based on other factors; hence, when a message is received from a manager of a user of device 101, 101a, a notification association associated with the manager can be provided (e.g. an associated vibration pattern) and a notification associated with a relevance level can precede or follow the notification associated with the manager.

In yet further alternative implementation, notifications associated with relevance level can be combined with notifications based on other factors; for example, when a message is received from a manager of a user of device 101, 101a, a notification association associated with the manager can be provided at one of a plurality of multi-level notification levels. Hence, when the message from the manager is high on a relevance scale (of Table 1, for example), the notification associated with the manager can be provided at a high power as compared to when a message from the manager is low on the same relevance scale.

In other words, processor 120 can be further enabled to: control notification device 129 to provide a notification based on the relevance level, the notification being one of a plurality of multi-level notifications, each associated with different relevance levels, the notification provided in tandem with a further notification setting local to device 101, the further notification based on factors stored at device 101, including, but not limited to senders of a message, an account of a message and a subject of a message, and the like. Alternatively, processor 120 can be further enabled to combine the notification with the further notification to provide a combined notification comprising the further notification provided at one of a plurality of multi-level notification levels corresponding to the plurality of multi-level notifications in a one-to-one relationship. Hence, processor 120 can be further enabled to provide relevance level notifications one or more of in tandem and in combination with a further notification.

In any event, present implementations provide a smart notification feature for a unified mailbox at devices, for example, a mobile device. The feature provides a notification of the incoming messages with different levels of notifications, for example, different levels of vibration, according to the relevance level of those messages. Further provided is a non-limiting example architecture for the smart notification system to enable the smart notification feature. Finally, a change in a communication protocol between a mail server (e.g. server 103) and devices (e.g. devices 101, 101a) to incorporate relevance level and reading pattern data associated with messages; in particular, a change to one or more of a header of messages and metadata of messages is provided to incorporate relevance level data.

Those skilled in the art will appreciate that in some implementations, the functionality of devices 101, 101a and server 103 can be implemented using pre-programmed hardware or firmware elements (e.g., application specific integrated circuits (ASICs), electrically erasable programmable read-only memories (EEPROMs), etc.), or other related components. In other implementations, the functionality of device 101, 101a and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a processor, a communication interface, and a vibration device, the processor configured to:
   provide a unified mailbox for managing a plurality of messages received via the communication interface from a plurality of accounts, wherein at least two of the plurality of accounts are one or more of: different types; and associated with different transport protocols;
   when a new message is received for the unified mailbox,
   detect an importance level parameter contained within the new message, the importance level set via an operator selection at a sender device that sent the new message;
   determine a relevance level associated with the new message, wherein the relevance level is based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern;
   determine, based on a current notification mode, whether to supersede the importance level with the relevance level; and
   responsive to a determination to supersede the importance level with the relevance level, control the vibration device to provide a notification vibration based on the relevance level, the notification vibration being one of a plurality of multi-level vibration notifications, each associated with different relevance levels, the plurality of multi-level vibration notifications comprising one or more of a multi-level of vibration of the vibration device, different levels of vibration of the vibration device, and different vibration patterns.

2. The device of claim 1, wherein the processor is further configured to determine the relevance level by receiving data for determining the relevance level from a server via the communication interface.

3. The device of claim 1, further comprising a memory storing associations between the plurality of multi-level vibration notifications and the different relevance levels.

4. The device of claim 1, wherein the plurality of multi-level vibration notifications are controlled by one or more of duration of vibration of the vibration device and power of the vibration device.

5. The device of claim 1, further comprising an input device and wherein one or more of the plurality of multi-level vibration notifications are manually set by receiving input data at the input device.

6. The device of claim 1, wherein the processor is further configured to provide the notification vibration one or more of in tandem and in combination with a further notification.

7. A method comprising:
   at a device comprising: a processor, a communication interface, and a vibration device, providing a unified mailbox for managing a plurality of messages received via the communication interface from a plurality of accounts, wherein at least two of the plurality of accounts are one or more of: different types; and associated with different transport protocols;
   when a new message is received for the unified mailbox,
   detecting, at the processor, an importance level assigned to the new message, the importance level originating at a sender device that sent the new message;
   determining, at the processor, a relevance level associated with the new message, wherein the relevance level is based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern;
   determining, at the processor, based on a current notification mode, whether to supersede the importance level with the relevance level; and
   responsive to a determination to supersede the importance level with the relevance level, controlling, at the processor, the vibration device to provide a notification vibration based on the relevance level, the notification vibration being one of a plurality of vibration multi-level notifications, each associated with different relevance levels, the plurality of multi-level vibration notifications comprising one or more of a multi-level of vibration of the vibration device, different levels of vibration of the vibration device, and different vibration patterns.

8. The method of claim 7, further comprising determining the relevance level by receiving data for determining the relevance level from a server via the communication interface.

9. The method of claim 7, further comprising storing associations between the plurality of multi-level vibration notifications and the different relevance levels at a memory of the device.

10. The method of claim 7, wherein the plurality of multi-level vibration notifications are controlled by one or more of duration of vibration of the vibration device and power of the vibration device.

11. The method of claim 7, wherein one or more of the plurality of multi-level vibration notifications are manually set by receiving input data at an input device of the device.

12. The method of claim 7, further comprising providing the notification vibration one or more of in tandem and in combination with a further notification.

13. A computer program product, comprising a non-transitory computer usable medium having a computer readable program code adapted to be executed to implement a method comprising:
   at a device comprising: a processor, a communication interface, and a vibration device, providing a unified mailbox for managing a plurality of messages received via the communication interface from a plurality of accounts, wherein at least two of the plurality of accounts are one or more of: different types; and associated with different transport protocols;
   when a new message is received for the unified mailbox,
   detecting, at the processor, an importance level assigned to the new message, the importance level originating at a sender device that sent the new message;
   determining, at the processor, a relevance level associated with the new message, wherein the relevance level is based on one or more of a sender of the new message, a subject of the new message, keywords in the new message, an account associated with the new message, a sender-recipient social connection, an interaction history, a topic-interest history, a manual relevance level history of previous messages manually set by a reader of the previous messages, and a reading pattern determining, at the processor, based on a current notification mode, whether to supersede the importance level with the relevance level; and responsive to a determination to supersede the importance level with the relevance level, controlling, at the processor, the vibration device to provide a notification vibration based on the relevance level, the notification vibration being one of a plurality of vibration multi-level notifications, each associated with different relevance levels, the plurality of multi-level vibration notifications comprising one or more of a multi-level of vibration of the vibration device, different levels of vibration of the vibration device, and different vibration patterns.

* * * * *